(12) United States Patent
Kobayashi

(10) Patent No.: US 6,335,815 B1
(45) Date of Patent: Jan. 1, 2002

(54) OPTICAL RECEIVER

(75) Inventor: Ippei Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/078,413

(22) Filed: May 14, 1998

(30) Foreign Application Priority Data

May 16, 1997 (JP) .............................................. 9-141196

(51) Int. Cl.$^7$ .......................... H04B 10/06; H04L 25/06; H04L 25/10

(52) U.S. Cl. ....................... 359/189; 359/194; 375/317; 375/319

(58) Field of Search ................................ 359/189, 194; 375/317, 318, 319

(56) References Cited

U.S. PATENT DOCUMENTS

| | | | |
|---|---|---|---|
| 4,792,997 | * | 12/1988 | saint et al. ..... 455/619 |
| 5,107,362 | * | 4/1992 | Ooshima et al. ..... 359/187 |
| 5,307,196 | * | 4/1994 | Kinoshita ..... 359/189 |
| 5,469,287 | * | 11/1995 | Eguchi/Ikuni ..... 359/189 |
| 5,629,792 | * | 5/1997 | Masaki ..... 359/245 |
| 5,706,118 | * | 1/1998 | Takano ..... 359/189 |

FOREIGN PATENT DOCUMENTS

| | |
|---|---|
| 53-70113 | 11/1951 |
| 58-47348 | 3/1983 |
| 62-2720 | 1/1987 |
| 62-32716 | 2/1987 |
| 2-90746 | 3/1990 |
| 2-156755 | 6/1990 |
| 3-208101 | 9/1991 |
| 3-258034 | 11/1991 |
| 4-49739 | 2/1992 |
| 4-90238 | 3/1992 |
| 4-220895 | 8/1992 |
| 4-269034 | 9/1992 |
| 4-358443 | 12/1992 |
| 5-90887 | 4/1993 |

* cited by examiner

*Primary Examiner*—Jason Chan
*Assistant Examiner*—M. R. Sedighian
(74) *Attorney, Agent, or Firm*—Young & Thompson

(57) ABSTRACT

An optical receiver includes a light-receiving device, an equalizing amplifier, a regenerating circuit, a timing signal extraction circuit, a reference voltage generation circuit, and a comparator. The light-receiving device converts input signal light into an electrical signal. The equalizing amplifier amplifies the electrical signal output from the light-receiving device and performs waveform shaping. The regenerating circuit regenerates data from an output from the equalizing amplifier on the basis of a retiming signal. The timing signal extraction circuit extracts a timing signal from an output signal from the equalizing amplifier. The reference voltage generation circuit generates a reference voltage changing in accordance with a variation in ambient temperature. The comparator compares an output signal from the timing signal extraction circuit with the reference voltage output from the reference voltage generation circuit and supplies the retiming signal to the regenerating circuit.

6 Claims, 4 Drawing Sheets

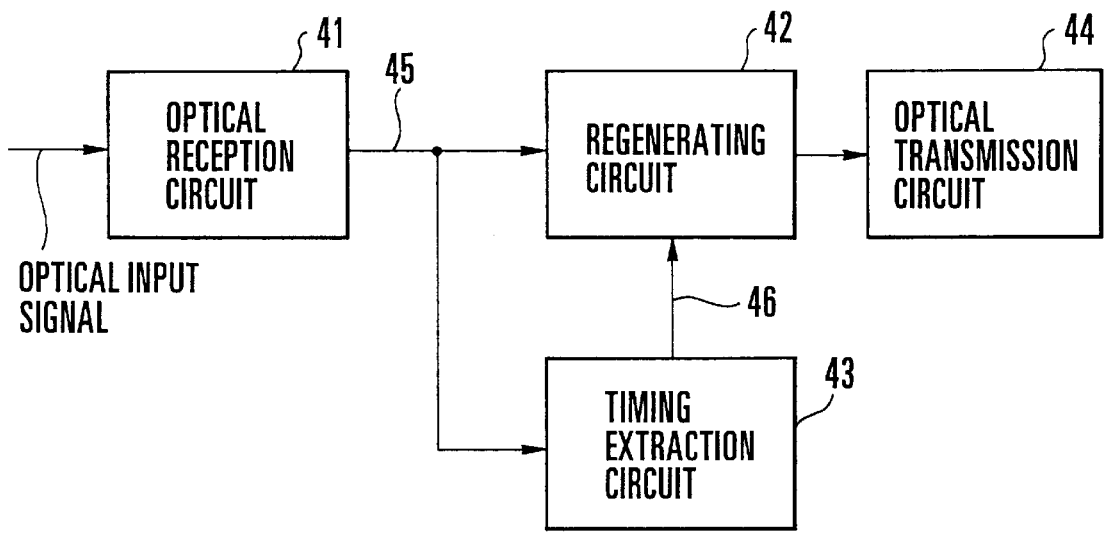
F I G. 4
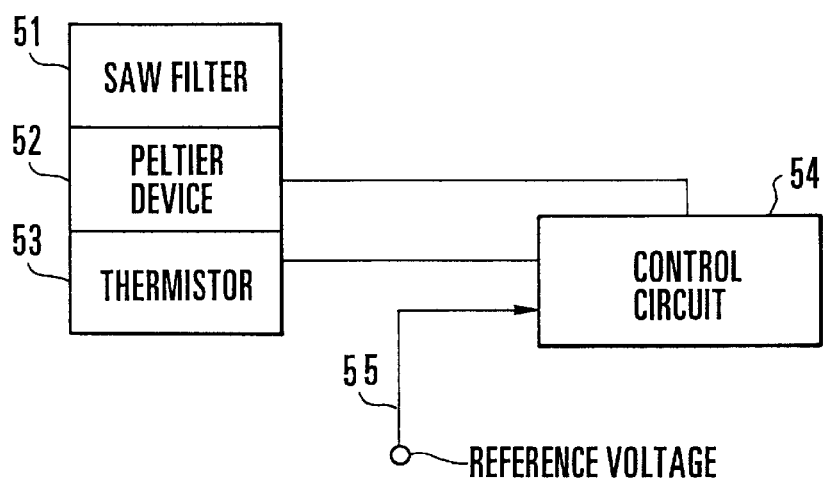
F I G. 5

OPTICAL RECEIVER

BACKGROUND OF THE INVENTION

The present invention relates to an optical receiver and, more particularly, to an optical receiver which compensates for a phase variation due to a change in temperature of a timing extraction circuit of a tank scheme.

Generally, an optical repeater requires a 3R function, i.e., a reshaping function of converting an optical input signal into an electrical signal, amplifying the signal, and shaping the waveform of the signal, a retiming function of extracting a timing component from the signal after reshaping, and a regenerating function of identifying "1" or "0" from the signal after reshaping and regenerating it to the same signal as a transmission pulse. Japanese Patent Laid-Open No. 3-258034 discloses a technique of controlling the temperature of a SAW (Surface Acoustic Wave) filter constituting a tuning circuit necessary for extracting the timing signal for regeneration to adjust the phase of the timing signal in the optical receiver having the 3R function. This prior art will be described with reference to FIGS. 4 and 5.

Referring to FIG. 4, the optical repeater comprises an optical reception circuit 41 for converting an optical input signal into an electrical signal 45 and performing reshaping, a regenerating circuit 42 for performing regenerating for the electrical signal 45 output from the optical reception circuit 41, a timing extraction circuit 43 for extracting the phase of a transmission pulse and supplying a timing signal 46 as a clock signal to the regenerating circuit 42, and an optical transmission circuit 44 for converting an electrical signal output from the regenerating circuit 42 into an optical signal again and sending it.

The timing extraction circuit 43 must suppress the jitter of the regeneration output pulse output as the timing signal 46. For this purpose, a pulse repetitive frequency component is extracted from an equalized waveform train output from the optical reception circuit 41 by a full-wave rectifier and a tuning circuit, and then amplification limitation is performed by a limiter amplifier, thereby obtaining the timing signal 46 having a small amplitude and phase error even for a wide-range mark ratio. In addition, a SAW filter is used for the tuning circuit. By controlling the temperature of the SAW filter, the phase of the timing signal 46 is adjusted.

FIG. 5 shows the arrangement of a phase adjustment circuit incorporated in the timing extraction circuit 43 shown in FIG. 4 to control the phase of the SAW filter constituting the tuning circuit for extracting a timing signal. The phase adjustment circuit shown in FIG. 5 comprises a SAW filter 51, a Peltier device 52, and a thermister 53, which are arranged integrally with each other, and a control circuit 54 to which a reference voltage is supplied.

Since the phase of the SAW filter 51 changes in proportion to the temperature, the phase can be set at a predetermined value by controlling the temperature. When the Peltier device 52 and the thermister 53 are controlled to a temperature corresponding to an externally supplied reference voltage 55 by the control circuit 54, the temperature of the SAW filter 51 is set to ensure a predetermined phase. In this arrangement, the temperature of the SAW filter 51 is set by adjusting the reference voltage 55, so the phase of the timing signal 46 output from the timing extraction circuit 43 can be adjusted.

In the conventional phase adjustment circuit, since the Peltier device 52 is used to perform temperature compensation, the power consumption increases upon heating/cooling the Peltier device. For this reason, this phase adjustment circuit can hardly be applied to an optical receiver with a transmission rate of the order of Gbit/sec or less, for which reduction of power consumption is required. In addition, since only the output phase of the SAW filter is controlled, phase variations generated by a circuit device other than the SAW filter cannot be compensated for.

SUMMARY OF THE INVENTION

It is an object of the present invention to provide an optical receiver which compensates for a phase variation due to the ambient temperature of a timing extraction circuit in the optical receiver at a low power consumption.

It is another object of the present invention to provide an optical receiver which compensates for a phase variation due to the temperature of an entire timing extraction circuit.

In order to achieve the above object, according to the present invention, there is provided an optical receiver comprising photoelectric conversion means for converting input signal light into an electrical signal, reshaping means for amplifying the electrical signal output from the photoelectric conversion means and performing waveform shaping, regenerating means for regenerating data from an output from the reshaping means on the basis of a retiming signal, timing signal extraction means for extracting a timing signal from an output signal from the reshaping means, reference voltage generation means for generating a reference voltage changing in accordance with a variation in ambient temperature, and a comparator for comparing an output signal from the timing signal extraction means with the reference voltage output from the reference voltage generation means and supplying the retiming signal to the regenerating means.

BRIEF DESCRIPTION OF THE DRAWINGS

FIG. 4 is a block diagram showing a conventional optical receiver; and

FIG. 5 is a block diagram showing a phase adjustment circuit incorporated in a timing extraction circuit shown in FIG. 4.

DESCRIPTION OF THE PREFERRED EMBODIMENT

The present invention will be described below in detail with reference to the accompanying drawings.

Figure 1:
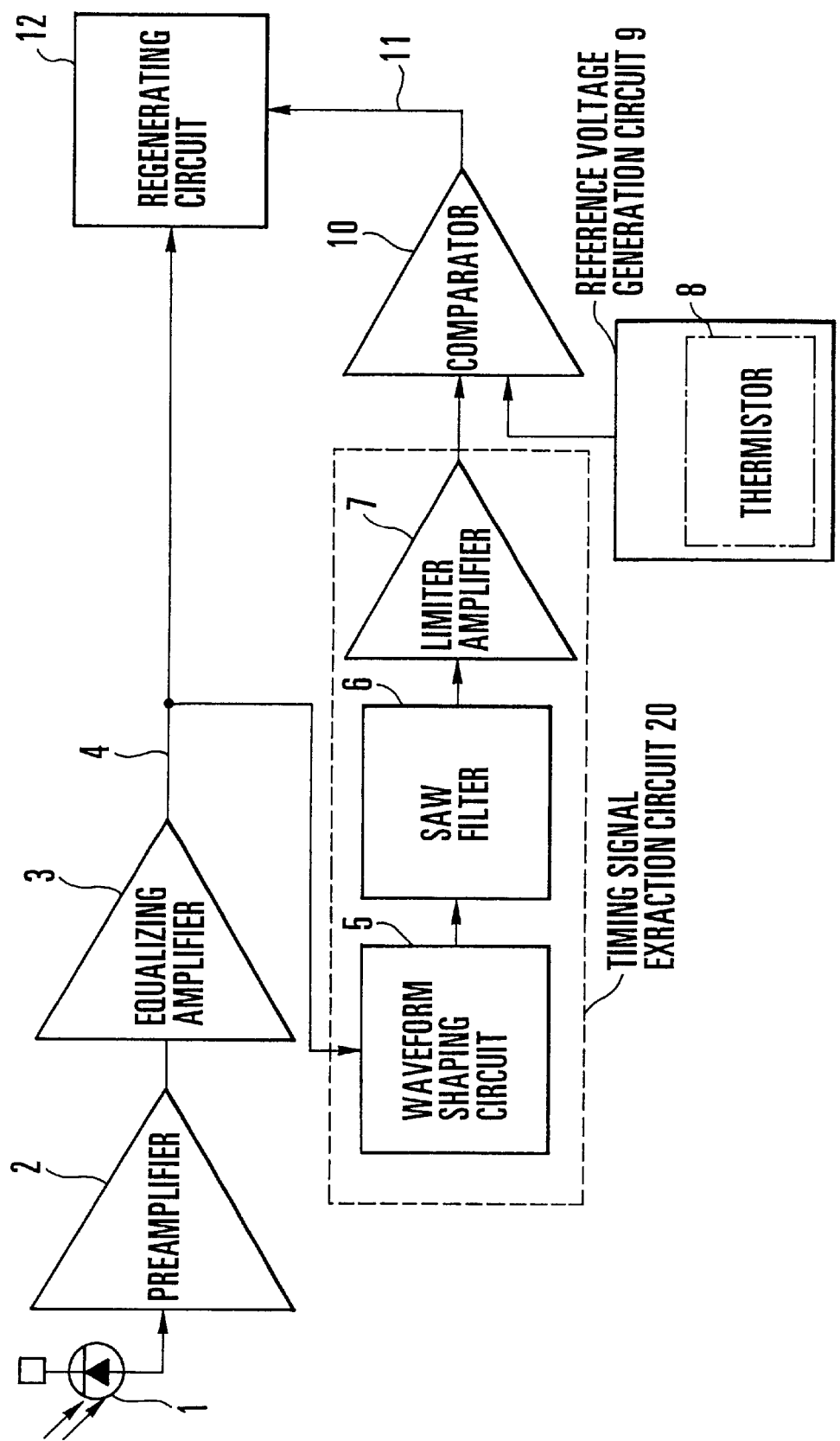
FIG. 1 is a block diagram showing an optical receiver according to an embodiment of the present invention.

FIG. 1 shows an optical receiver according to an embodiment of the present invention. Referring to FIG. 1, an optical input signal is converted into an electrical signal (current signal) by a light-receiving device 1 and then converted into a voltage signal by a preamplifier 2. The voltage signal output from the preamplifier 2 is equalized and amplified by an equalizing amplifier 3 and output as a data signal 4. The data signal 4 output from the equalizing amplifier 3 is supplied to a regenerating circuit 12 and also to a waveform shaping circuit 5 for extracting a timing.

The data signal 4 which has undergone waveform shaping by the waveform shaping circuit 5 is input to a SAW filter 6 as a tuning circuit, and a timing component is extracted. The output signal from the SAW filter 6 is amplified by a limiter amplifier 7 and supplied to one input terminal of a comparator 10. The waveform shaping circuit 5, the SAW filter 6, and the limiter amplifier 7 constitute a timing signal extraction circuit 20.

A reference voltage (threshold voltage) from a reference voltage generation circuit 9 is supplied to the other input terminal of the comparator 10. The reference voltage generation circuit 9 is constituted by a power supply voltage and a resistance divider which divides the power supply voltage using a thermister 8 and resistors (not shown) to generate the reference voltage. The output from the comparator 10 is supplied to the regenerating circuit 12 as a retiming signal 11. The regenerating circuit 12 regenerates the data signal 4 output from the equalizing amplifier 3 using the retiming signal 11 as a clock signal.

The retiming signal extraction operation of the optical receiver having the above arrangement will be described next.

The timing signal extraction circuit 20 constituted by the waveform shaping circuit 5, the SAW filter 6, and the limiter amplifier 7 extracts the timing signal from the data. The comparator outputs the retiming signal 11 in accordance with the timing signal output from the timing signal extraction circuit 20. The duty ratio of the retiming signal 11 output from the comparator 10 depends on the reference voltage output from the reference voltage generation circuit 9.

The reference voltage generation circuit 9 generates a reference voltage having temperature characteristics and outputs it to the comparator 10. Therefore, the duty ratio of the clock pulse, i.e., the retiming signal 11 output from the comparator 10 is controlled by the temperature. The timing signal output from the timing signal extraction circuit 20 is output as the retiming signal 11 which has undergone compensation for the phase variation due to the ambient temperature. To set the reference voltage, phase variations of the timing signal at some temperature points are measured, and the values of the thermister and resistors are set to suppress the variations.

Figure 2:
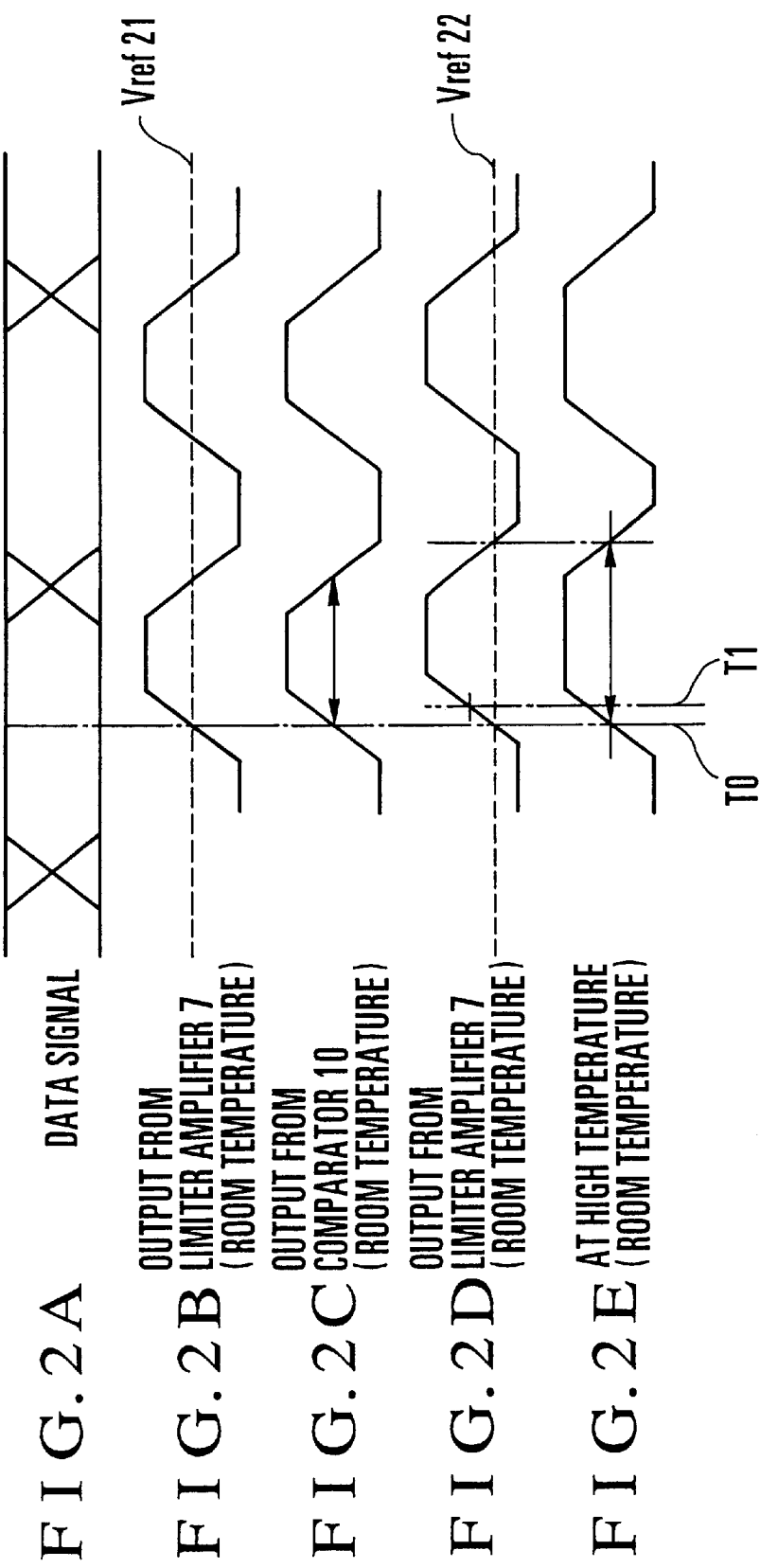
FIGS. 2A to 2E are timing charts showing the retiming signal extraction operation of the optical receiver shown in FIG. 1.

This temperature compensation will be described in more detail with reference to FIGS. 2A to 2F. The optimum phase of the timing signal for regenerating the data signal (FIG. 2A) is represented as T0. At room temperature, the output from the limiter amplifier 7 (FIG. 2B) is input to the comparator 10 using Vref21 as a reference voltage, so a pulse signal (FIG. 2C) controlled in the duty ratio is output. At this time, the threshold voltage Vref21 is set at the central voltage of the amplitude of the output from the limiter amplifier 7 (FIG. 2B). For this reason, the phase of the output from the comparator 10 (FIG. 2C) matches the optimum phase T0, so the duty ratio does not change.

On the other hand, at a high temperature, the phase of the output from the limiter amplifier 7 (FIG. 2D) changes to T1. At this time, the reference voltage from the reference voltage generation circuit 9 lowers to a voltage value Vref22 corresponding to the phase T0 of the output from the limiter amplifier 7 at the high temperature (FIG. 2D). When the reference voltage of the comparator 10 lowers, the duty ratio of the output from the comparator 10 (FIG. 2E) changes, so control is performed to obtain the phase T0. With this arrangement, the variation in phase relationship between the data signal and the timing signal due to the temperature is compensated for.

Figure 3:
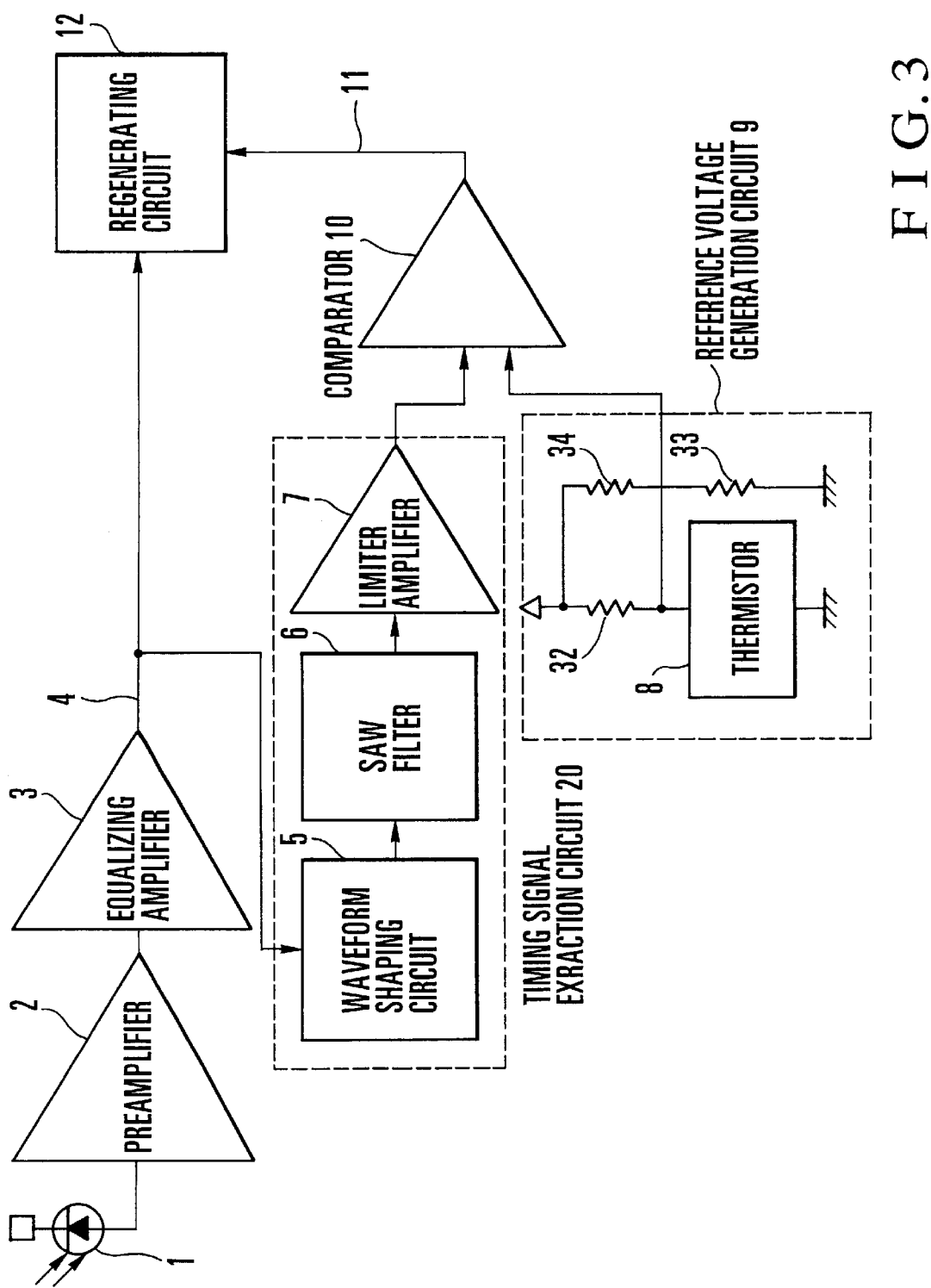
FIG. 3 is a circuit diagram showing details of the optical receiver shown in FIG. 1 and, more particularly, a reference signal generation circuit.

FIG. 3 shows details of the optical receiver shown in FIG. 1 and, more particularly, the reference voltage generation circuit.

The reference voltage generation circuit 9 is constituted by a resistance division (voltage division) circuit comprising the thermister 8 and resisters 32 to 34. The thermister 8 has a resistance of 50 kΩ (@+25° C.) and a constant B of 3,950. The resistances of the resistors 32 to 34 are 750 Ω, 4.7 kΩ, and 500 Ω, respectively. The power supply voltage is 5 V.

In this case, the reference voltage of the comparator 10 is 4.47 V at a low temperature, 4.6 v at room temperature, and 4.71 V at a high temperature. When the reference voltage of the comparator 10 is fixed, the phase of the output from the limiter amplifier 7 varies within a range of 100 ps between the low and high temperatures. Therefore, when the reference voltage is changed, a timing signal for which the phase variation is compensated for can be output.

According to the present invention, the control circuit which adjusts the waveform of the timing signal in accordance with a change in temperature to compensate for the phase variation is used. Unlike the prior art, the phase variation due to a change in temperature in the timing extraction circuit can be compensated for with a relatively simple arrangement without any heating/cooling means.

What is claimed is:

1. An optical receiver comprising:

photoelectric conversion means for converting input signal light into an electrical signal;

reshaping means for amplifying the electrical signal output from said photoelectric conversion means and performing waveform shaping;

regenerating means for adjusting a phase of an output from said reshaping means on the basis of a retiming signal;

timing signal extraction means for extracting a timing signal from an output signal from said reshaping means;

reference voltage generation means for generating voltage changing in accordance with a variation in ambient temperature; and a comparator for comparing an output signal from said timing signal extraction means with the reference voltage output from said reference voltage generation means and supplying the retiming signal to said regenerating means.

2. A receiver according to claim 1, wherein said timing signal extraction means comprises a waveform shaping circuit for shaping a waveform of the output signal of said reshaping means, and a SAW filter for extracting a tuning signal of an output signal from said waveform shaping circuit.

3. A receiver according to claim 2, further comprising a limiter amplifier for amplifying an output signal from said saw filter and outputting the signal to said comparator.

4. A receiver according to claim 1, wherein said reference voltage generation means comprises a thermistor and resistors which divide a power supply voltage.

5. A receiver according to claim 1, wherein said comparator outputs, as the retiming signal, a pulse signal whose duty ratio changes in accordance with a change in reference voltage.

6. A receiver according to claim 5, wherein said reference voltage generation means generates a reference voltage having a smaller/larger value than that at room temperature when the ambient temperature increases/decreases, and said comparator changes the duty ratio of the pulse signal in accordance with an increase/decrease in reference voltage to output the retiming signal having a constant phase.

* * * * *